United States Patent
Fuller et al.

(10) Patent No.: US 11,161,233 B2
(45) Date of Patent: Nov. 2, 2021

(54) VERTICAL DRILL MOUNT

(71) Applicant: North Mechanical Contracting Inc., Indianapolis, IN (US)

(72) Inventors: Greg Fuller, Indianapolis, IN (US); Kevin Blandford, Westfield, IN (US); Tole Burnett, Danville, IN (US)

(73) Assignee: North Mechanical Contracting Inc., Indianapolis, IN (US)

( * ) Notice: Subject to any disclaimer, the term of this patent is extended or adjusted under 35 U.S.C. 154(b) by 30 days.

(21) Appl. No.: 16/745,096

(22) Filed: Jan. 16, 2020

(65) Prior Publication Data

US 2021/0220954 A1 Jul. 22, 2021

(51) Int. Cl.
*B23B 47/26* (2006.01)
*B25H 1/00* (2006.01)
*B23Q 3/18* (2006.01)

(52) U.S. Cl.
CPC ........... *B25H 1/0021* (2013.01); *B23B 47/26* (2013.01); *B23Q 3/18* (2013.01); *Y10S 408/712* (2013.01); *Y10T 408/6779* (2015.01); *Y10T 408/6786* (2015.01)

(58) Field of Classification Search
CPC ... B23B 47/26; B23B 47/287; B23B 2247/00; B23Q 3/18; B25H 1/0035; B25H 1/0021; B25H 1/0085; B25H 1/0042; Y10S 408/712; Y10T 408/5612; Y10T 408/6779; Y10T 408/6786
See application file for complete search history.

(56) References Cited

U.S. PATENT DOCUMENTS

| | | | | |
|---|---|---|---|---|
| 3,060,769 | A * | 10/1962 | Heider | B25H 1/0064 408/95 |
| 4,521,140 | A * | 6/1985 | Doescher | B23B 47/287 408/108 |
| 4,736,804 | A * | 4/1988 | Geibel | B25H 1/0035 173/30 |
| 5,662,568 | A * | 9/1997 | Lindem | B23Q 1/017 408/234 |
| 5,720,542 | A * | 2/1998 | Birge, Jr. | B25B 13/481 362/109 |
| 6,050,753 | A * | 4/2000 | Turner | B25H 1/0064 408/88 |
| 2015/0030403 | A1* | 1/2015 | Nowland | B25H 1/0064 408/100 |
| 2020/0391302 | A1* | 12/2020 | Hill | B23B 47/28 |

FOREIGN PATENT DOCUMENTS

| DE | 3015532 A1 * | 10/1981 | ........... B25H 1/0035 |
|---|---|---|---|
| DE | 202019001394 U1 * | 4/2019 | ........... B25H 1/0021 |

OTHER PUBLICATIONS

Machine Translation, DE202019001394U1. (Year: 2019).*
Machine Translation, DE3015532. (Year: 1981).*

* cited by examiner

*Primary Examiner* — Eric A. Gates
*Assistant Examiner* — Chwen-Wei Su
(74) *Attorney, Agent, or Firm* — Quarles & Brady LLP

(57) ABSTRACT

A first example drill mount assembly includes a base assembly and a mast. The base assembly has a first mount, a second mount, and an adjuster plate. The second mount is extendable relative to the first mount. The adjuster plate is slidable relative to the second mount. The mast extends from the adjuster plate.

16 Claims, 13 Drawing Sheets

VERTICAL DRILL MOUNT

FIELD OF THE DISCLOSURE

Embodiments of the present disclosure generally relate to a construction tool, and, more particularly, to a vertical drill mount.

BACKGROUND

In residential and commercial construction, it often is desirable or necessary to suspend mechanical, plumbing, or electrical systems from a ceiling of one or more floors of a building. For example, buildings may have heating, ventilation, and air conditioning (HVAC) ductwork, sprinkler systems, plumbing, electrical conduits, lighting, etc., hung from the ceilings.

Certain known fastener systems are configured to mount into holes drilled into the ceiling. In some cases, such as commercial or mid-level and high-rise residential installations, the ceiling may be made of concrete. In those instances, the holes are drilled in the concrete once the concrete has cured.

In new construction applications, buildings may be designed to provide alternative or complementary mounting means in order to minimize the degree to which ceiling mounted fastening systems are needed. In other applications, such as rehabs or retrofits, a contractor's options may be more limited, as he may have to develop an installation plan that accounts for an already-existing structure. In such latter applications, mounting directly to a ceiling may be the only feasible or economical option, but such an installation may require the use of a significantly larger number of anchors.

In the situation where a ceiling is made of concrete, it may be necessary to use a drill with sufficient power and torque to adequately and accurately drill into the ceiling. It also may be necessary to employ a hammer drill, which applies a percussive force to the substrate in addition to a traditional drilling motion. While such drills are effective in creating the necessary holes, they also tend to be heavier than traditional drills. Between that weight and the reactionary forces experienced by an operator, their use can quickly lead to user fatigue, particularly when one remembers that the holes are being drilled in the ceiling, which requires the operator to lift the drill overhead to drill the holes. Improper drilling of the holes also may lead to misalignment and/or poor mounting of the fastener. Further, operator fatigue may slow progress in installing the ceiling-mounted systems.

Therefore, it would be desirable to have an apparatus that addresses one or more of these shortcomings.

SUMMARY

In one aspect, a drill mount assembly is disclosed that includes a base assembly and a mast. The base assembly has a first mount, a second mount, and an adjuster plate. The second mount is extendable relative to the first mount. The adjuster plate is slidable relative to the second mount. The mast extends from the adjuster plate.

In another aspect, a drill mount assembly is disclosed that includes a base assembly and an upright assembly. The base assembly has a first foot, a rail, a second foot, and an adjuster plate. The rail is connected to the first foot. The second foot is extendably connected to the rail. The adjuster plate slidably engaged with the rail. The upright assembly has a mast, and an electrical outlet. The mast is connected to the adjuster plate. The electrical outlet is connected to the mast.

In a further aspect, a drill mount assembly is disclosed that includes a base, a mast, rack gear, a carriage, and an electrical outlet. The base has a first inner face, a second inner face, and an adjuster plate. The second inner face is telescopically moveable relative to the first inner face. The adjuster plate is laterally moveable relative to the first inner face and the second inner face. The mast is connected to the adjuster plate. The rack gear is disposed along the mast. The carriage is moveably engaged with the mast and selectively engageable with the rack gear. The electrical outlet is connected to the mast.

Figure 1:
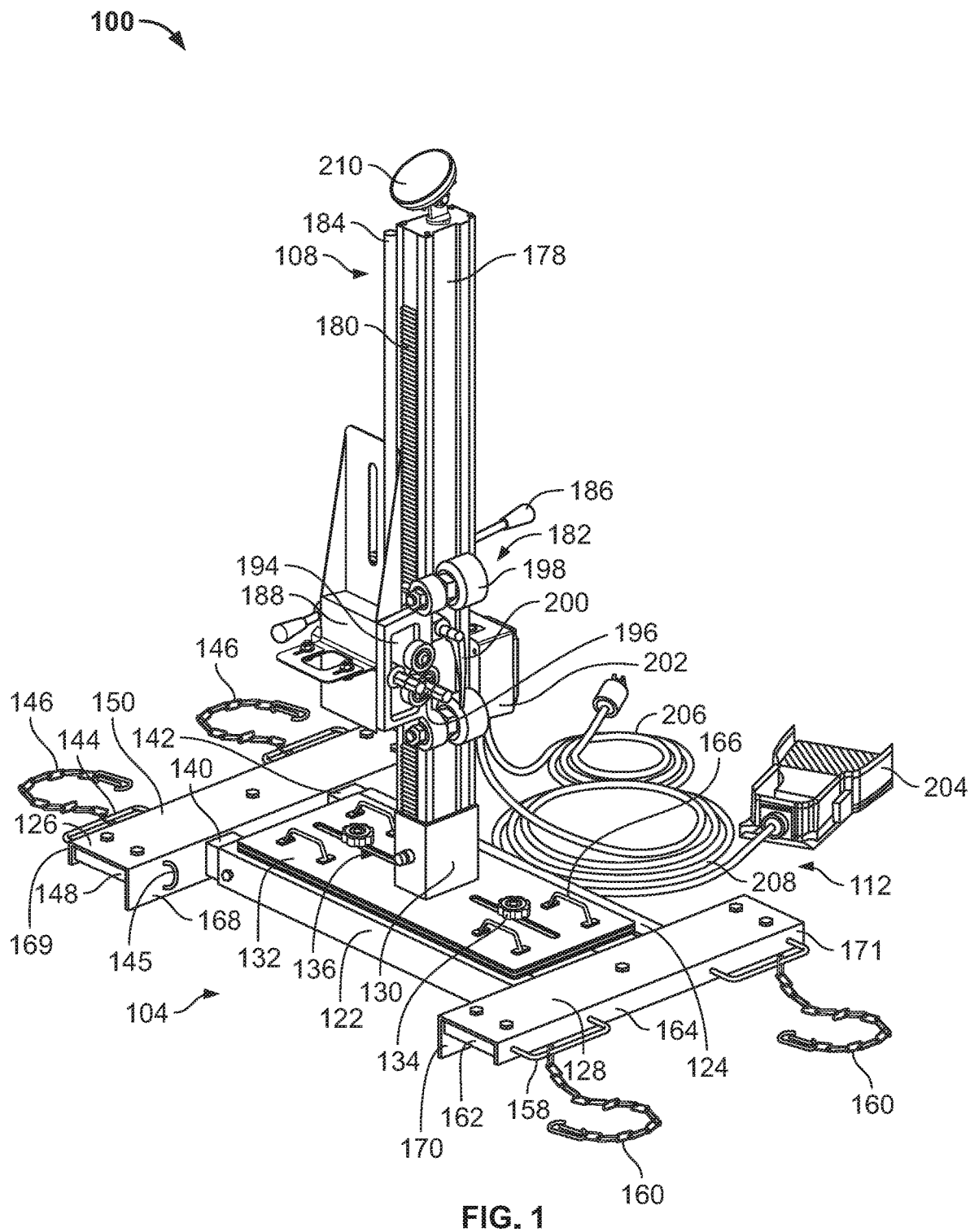
FIG. 1 is an isometric view of a first example drill mount assembly according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide an ergonomic drill mount assembly with features that aid operators in elevating a drill to quickly and accurately drill holes in ceilings.

A first example drill mount assembly 100 according to an embodiment of the present disclosure is depicted in FIGS. 1-8 and 10. The drill mount assembly 100 includes a base assembly 104, an upright assembly 108, and electrical components 112. The upright assembly 108 is mounted to the base assembly 104, and the electrical components 112 may be connected to the upright assembly 108.

Figure 4:
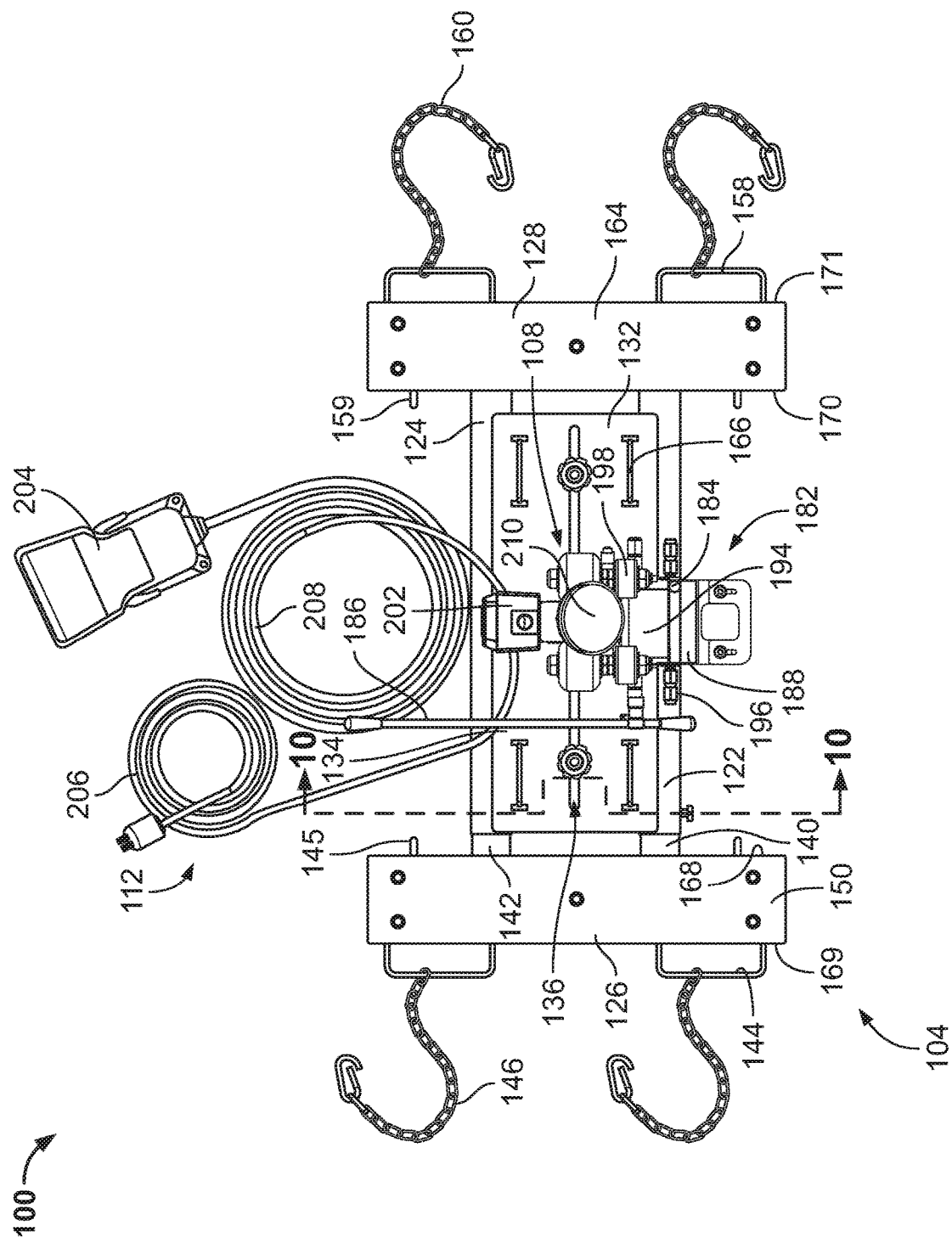
FIG. 4 is a top view of a first example assembly including the first example drill mount assembly of FIGS. 1-3 utilized with a drill.
Figure 5:
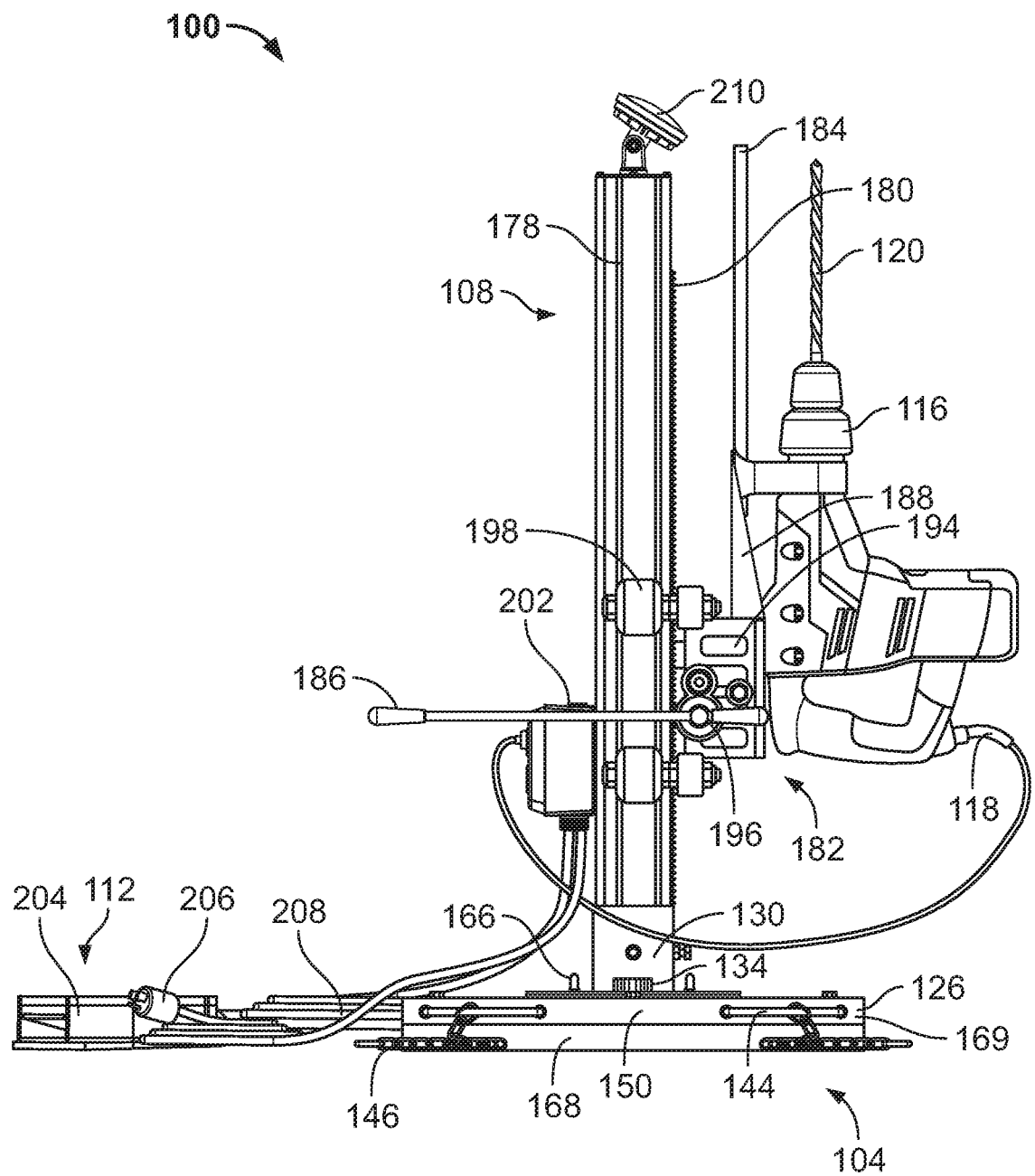
FIG. 5 is a side view of the first example assembly of FIG. 4.
Figure 6:
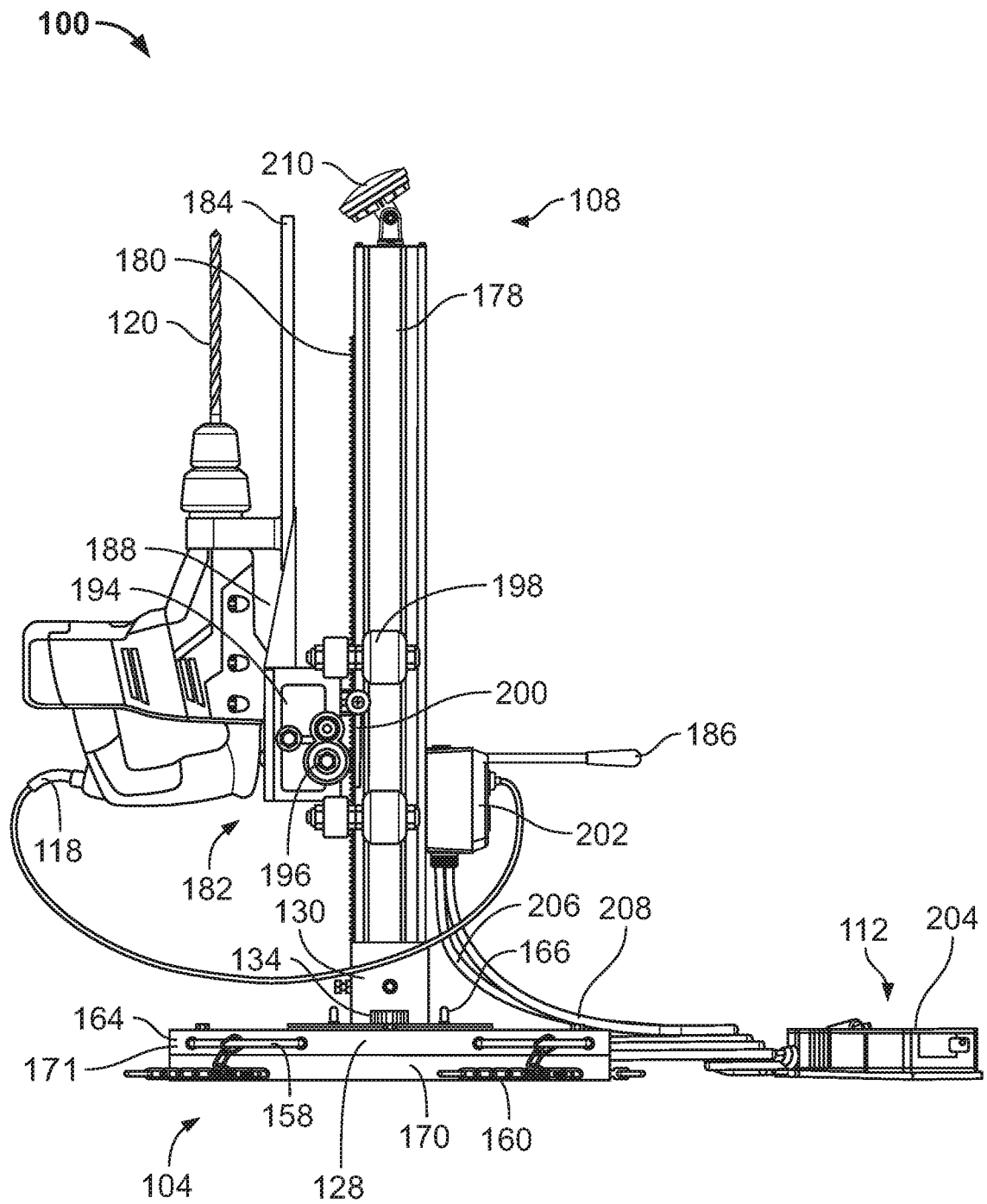
FIG. 6 is another side view of the first example assembly of FIGS. 4 and 5.
Figure 7:
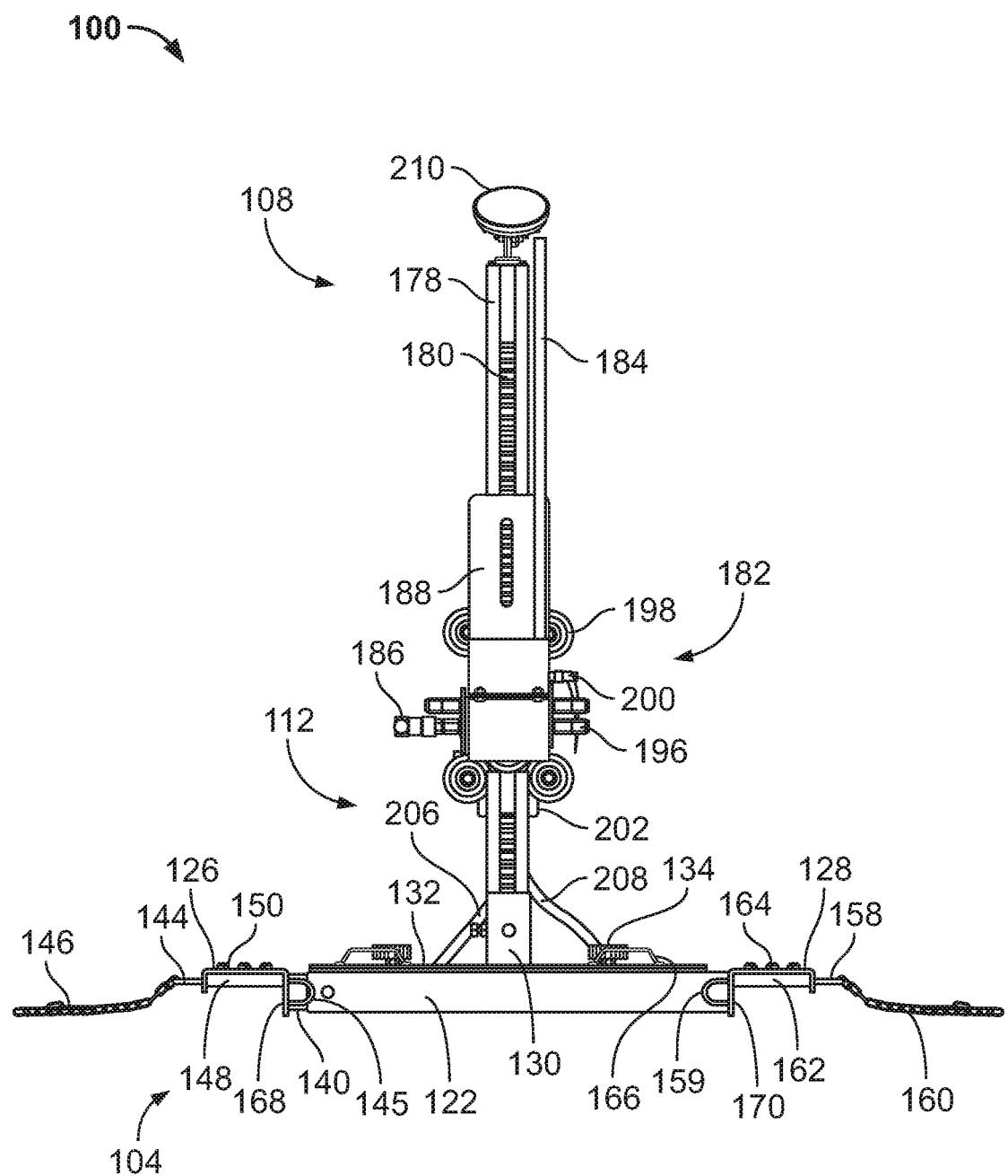
FIG. 7 is a front view of the first example drill mount assembly of FIGS. 1-6.
Figure 8:
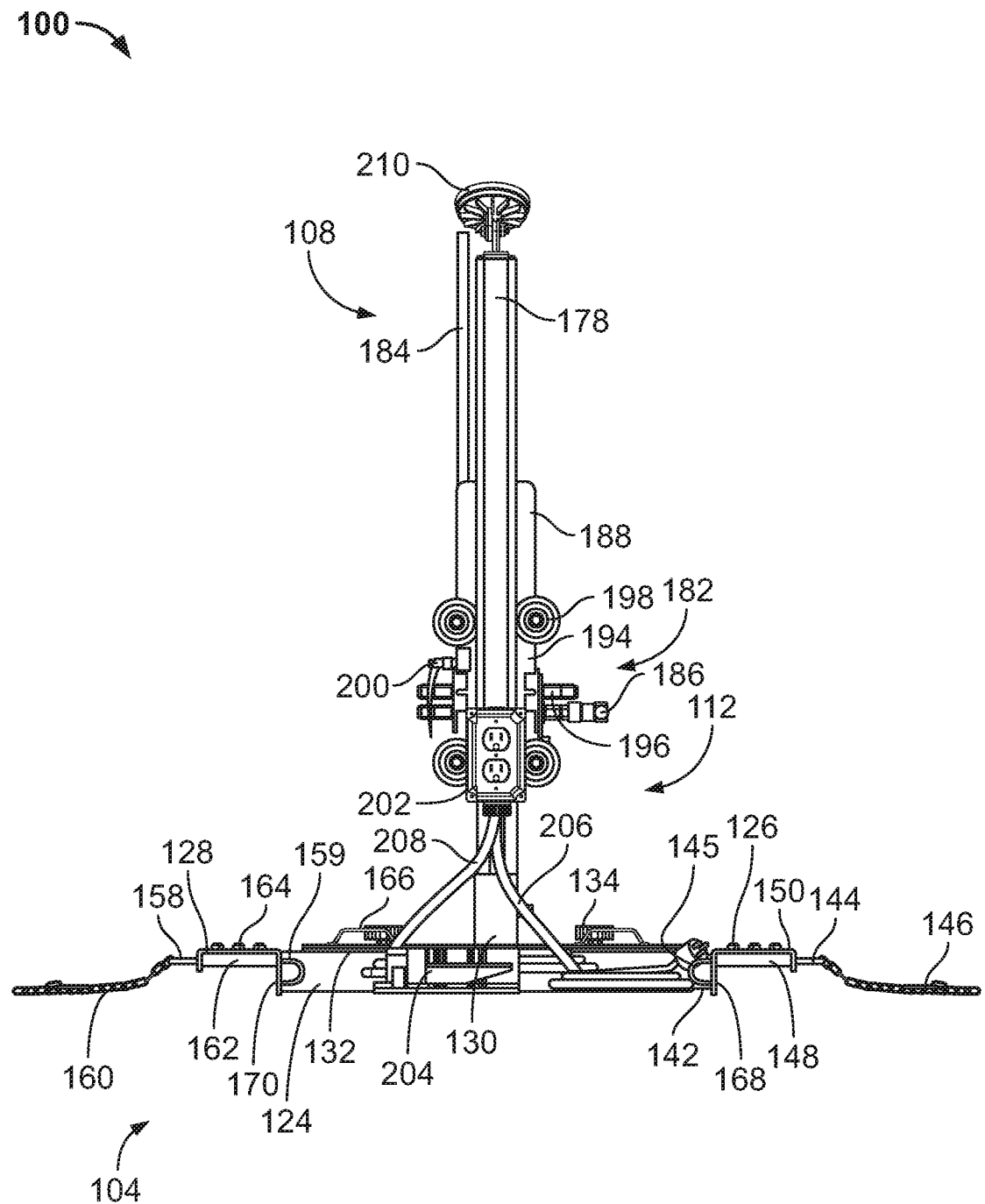
FIG. 8 is a rear view of the first example drill mount assembly of FIGS. 1-7.

With reference to FIGS. 4-6, a drill 116 may be mounted to the upright assembly 108. The drill 116 includes a first electrical cord 118. The drill 116 supports and grips a bit 120. In some instances, the drill 116 is a hammer drill. In some instances, the bit 120 is a masonry bit.

With reference to FIGS. 1-8, the base assembly 104 includes a first rail 122, a second rail 124, a first foot 126, a second foot 128, a mast bracket 130, an adjuster plate 132, and a plurality of fasteners 134. The adjuster plate 132 defines slots 136. More specifically, the first foot 126 is slidably engaged with the first rail 122 and the second rail 124. The second foot 128 may be opposite and substantially parallel to the first foot 126. The second foot 128 may be fixedly connected to the first rail 122 and the second rail 124. The mast bracket 130 may be connected to and may extend from the adjuster plate 132. In one aspect, the mast bracket 130 may be fixedly attached substantially perpendicular to the adjuster plate 132. In another aspect, the mast bracket 130 may be pivotally coupled to the adjuster plate, e.g., through use of a fastener configured to sit in and ride along an angled or curved slot in one or both of the mast bracket 130 and a mast. The adjuster plate 132 may be slidably engaged with the first rail 122 and the second rail 124 to permit lateral translation of the adjuster plate 132 relative to the rails in a direction substantially parallel a length of the rails. The plurality of fasteners 134 extend through the slots 136 to slidably retain the adjuster plate 132 on the first rail 122 and the second rail 124. In some embodiments, the plurality of fasteners 134 extend through complementary openings in the first rail 122 and the second rail 124. In some embodiments, the plurality of fasteners 134 may be integral with and extend from the first rail 122 and the second rail 124 (e.g., as welded-on studs). In some embodiments, the plurality of fasteners 134 are quick-release fasteners (e.g., wing nuts, cam levers, knobs, T-handles, etc.). In some embodiments, the contact surfaces between the first rail 122, the second rail 124, and/or the adjuster plate 132 are formed of and/or coated in a polymer having low-friction surface properties (e.g., polytetrafluoroethene (PTFE) or perfluoroalkoxy polymer resin (PFA)).

With reference to FIGS. 1-4, the first foot 126 includes a first extender 140, a second extender 142, a first set of lifting handles 144, a first set of chain anchor loops 145, a first set of retention chains 146, a first pad 148, and a first mount 150. The first extender 140 and the second extender 142 may be fixedly connected to the first mount 150. The first set of lifting handles 144 extend outward from the first mount 150, opposite the first extender 140 and the second extender 142. The first set of chain anchor loops 145 extend inward from the first mount 150, opposite the first set of lifting handles 144. The first set of retention chains 146 may be secured to the first set of lifting handles 144 and are configured to removably clip onto the first set of chain anchor loops 145. The first mount 150 is generally C-shaped, opening downward. The first pad 148 is connected to and nested in the first mount 150. The first extender 140 is slidably disposed in the first rail 122, and the second extender 142 is slidably disposed in the second rail 124. In particular, both the first and second rails may have rectangular cross-sections that are bounded on at least part of all four sides such that the first and second extenders may only be able to translate within the interior volumes of the rails. In another aspect, the first and second rails, as well as the first and second extenders, may have generally circular cross-sections, again to facilitate translation of the extenders relative to the rails. Thus, the first foot 126 slidably and telescopically extends and retracts relative to the second foot 128, the first rail 122, the second rail 124, the mast bracket 130, and the adjuster plate 132.

With reference to FIGS. 1-4, the second foot 128 includes a second set of lifting handles 158, a second set of chain anchor loops 159, a second set of retention chains 160, a second pad 162, and a second mount 164. The second mount 164 may be fixedly connected to the first rail 122 and the second rail 124. The second set of lifting handles 158 extend outward from the second mount 164, opposite the first rail 122 and the second rail 124. The second set of chain anchor loops 159 extend inward from the second mount 164, opposite the second set of lifting handles 158. The second set of retention chains 160 may be secured to the second set of lifting handles 158 and are configured to removably clip onto the second set of chain anchor loops 159. The second mount 164 is generally C-shaped, opening downward. The second pad 162 is connected to and nested in the second mount 164. Additionally, a third set of lifting handles 166 may be mounted to the adjuster plate 132, extending upwardly opposite the first rail 122 and the second rail 124.

The drill mount assembly 100 may be lifted and transported using one or more of the first set of lifting handles 144, the second set of lifting handles 158, and/or the third set of lifting handles 166. Additionally, the drill mount assembly 100 may be secured to an underlying structure (e.g., a scissor lift, a cart, a work table, etc.) (not shown) using the first set of retention chains 146 and/or the second set of retention chains 160. The first pad 148 and second pad 162 are configured to cushion engagement of the drill mount assembly 100 with an underlying structure and/or reduce vibration of the drill mount assembly 100 relative to the underlying structure. In some embodiments, the first pad 148 and second pad 162 are formed of a relatively soft material (e.g., polymer plastic, felt, rubber, etc.).

With reference to FIGS. 1-3, 7, and 8, the first mount 150 and the second mount 164 are substantially mirror images of one another. As discussed above, each of the first mount 150 and second mount 164 are generally C-shaped. Thus, the first mount 150 has a first inner face 168 and a first outer face 169 depending downwardly from an upper surface, and the second mount 164 has a second inner face 170 and a second outer face 171 depending downwardly from an upper surface, where each inner face extends downwardly a greater distance than its respective outer face. The spacing between the inner face and outer face of each mount may be sized so as to accommodate rails of an underlying structure such as a traditional scissor lift. For example, the spacing between those faces may be between about 1 inch and about 5 inches, preferably between about 1.5 inches and about 3 inches. The first inner face 168 and the second inner face 170 then may be configured to laterally and rotationally retain the drill mount assembly 100 relative to the underlying structure (not shown).

For example, when the drill mount assembly 100 is mounted on the railings of a scissor lift, as the drill 116 rotates, an opposite rotational torque may be transmitted to the drill mount assembly 100, causing the assembly to want to rotate in an opposite direction. In such a situation, frictional forces between the first pad 148 and second pad 162 and the railing surfaces may act to oppose rotation of the drill mount assembly 100. Additionally, should the rotational force caused by the drill exceed the resistive frictional forces, the drill mount assembly 100 then may be configured to only rotate slightly to the point that diagonally opposite portions of the first inner face 168 and the second inner face 170 engage inner faces of complementary railings of a scissor lift. Thus, in operation, the first inner face 168 and the second inner face 170 provide reaction forces to hold the drill mount assembly 100 rotationally and laterally steady when torque is applied to the drill mount assembly 100 by the drill 116.

With reference to FIGS. 1 and 6, the upright assembly 108 includes a mast 178, a rack gear 180, a carriage 182, a depth-limiting rod 184, an actuating lever 186, and a support bracket 188. The mast 178 is removably connected to the mast bracket 130. The mast 178 and the adjuster plate 132 are substantially perpendicular. The rack gear 180 is connected to and runs lengthwise along the mast 178. The carriage 182 is movably connected to the mast 178 and selectively engageable with the rack gear 180. The depth-limiting rod 184 extends upwardly from and is adjustable relative to the support bracket 188, extending generally parallel to the mast 178. The actuating lever 186 is configured to removably connect to the carriage 182. The support bracket 188 is connected to the carriage 182. With reference to FIG. 6, the support bracket 188 is configured to retain and support the drill 116.

Figure 2:
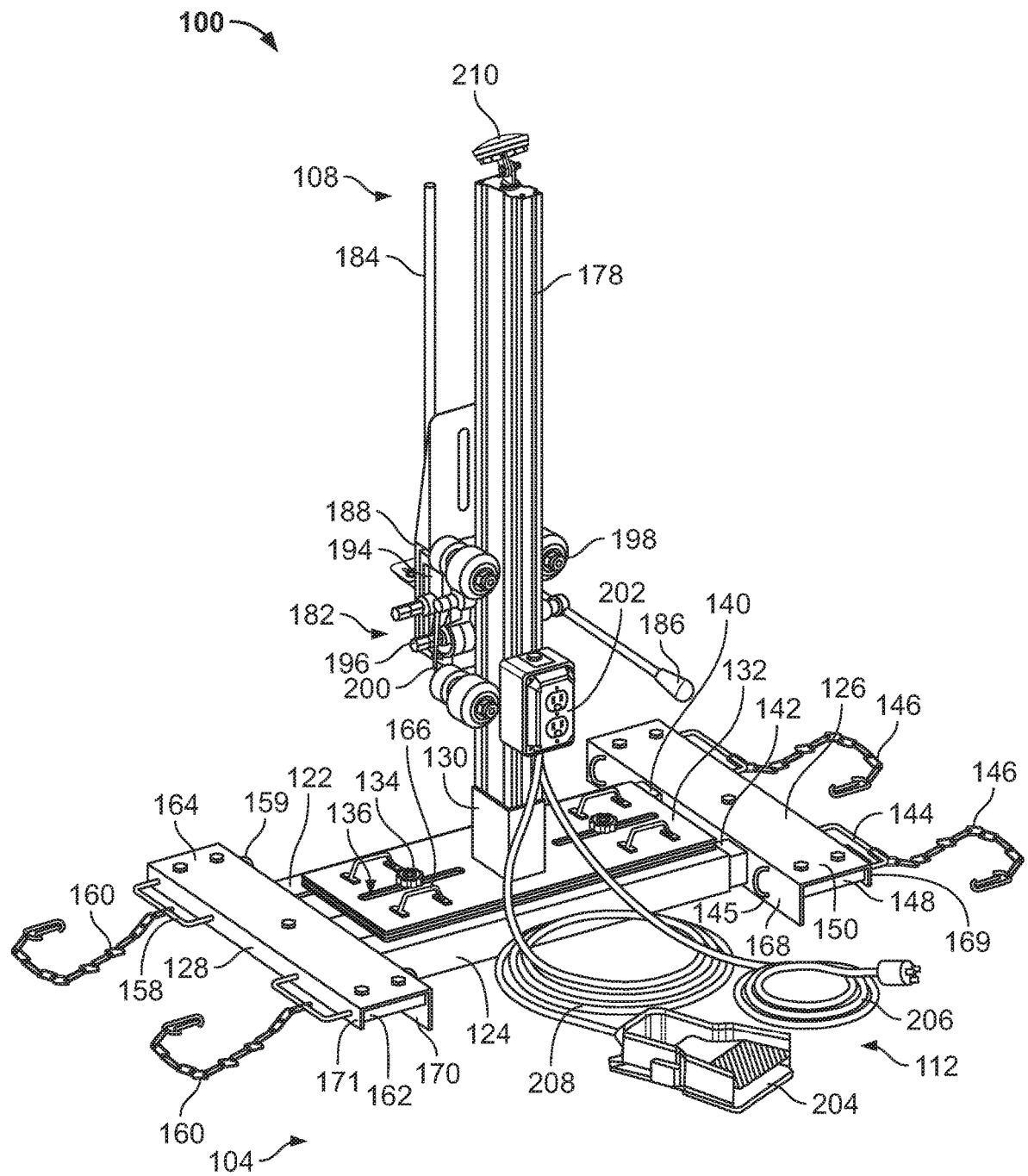
FIG. 2 is another isometric view of the first example drill mount assembly of FIG. 1.
Figure 3:
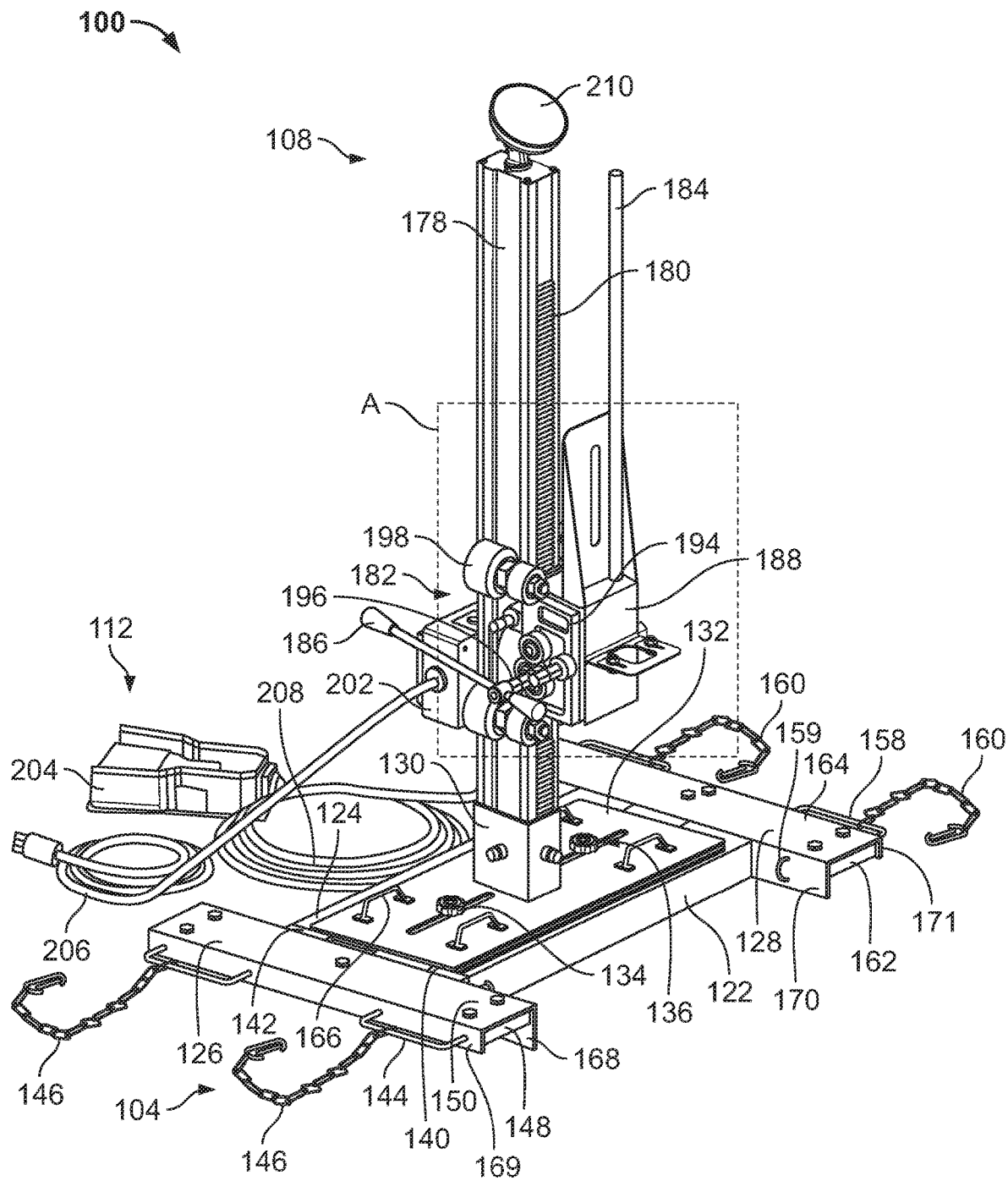
FIG. 3 is another isometric view of the first example drill mount assembly of FIGS. 1 and 2.
Figure 11:
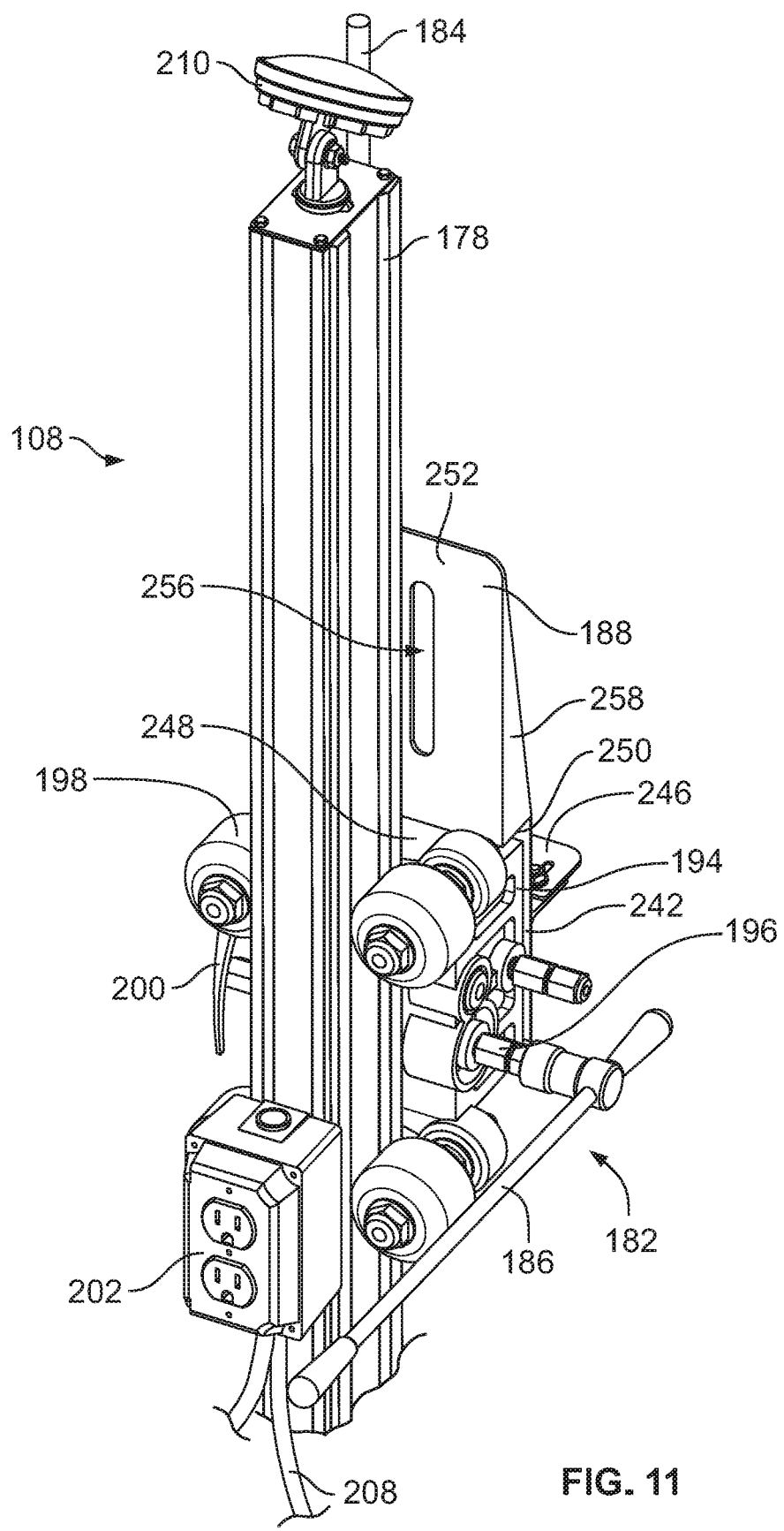
FIG. 11 is a partial view of an upright assembly of the first example drill mount assembly of FIGS. 1-9.
Figure 13:
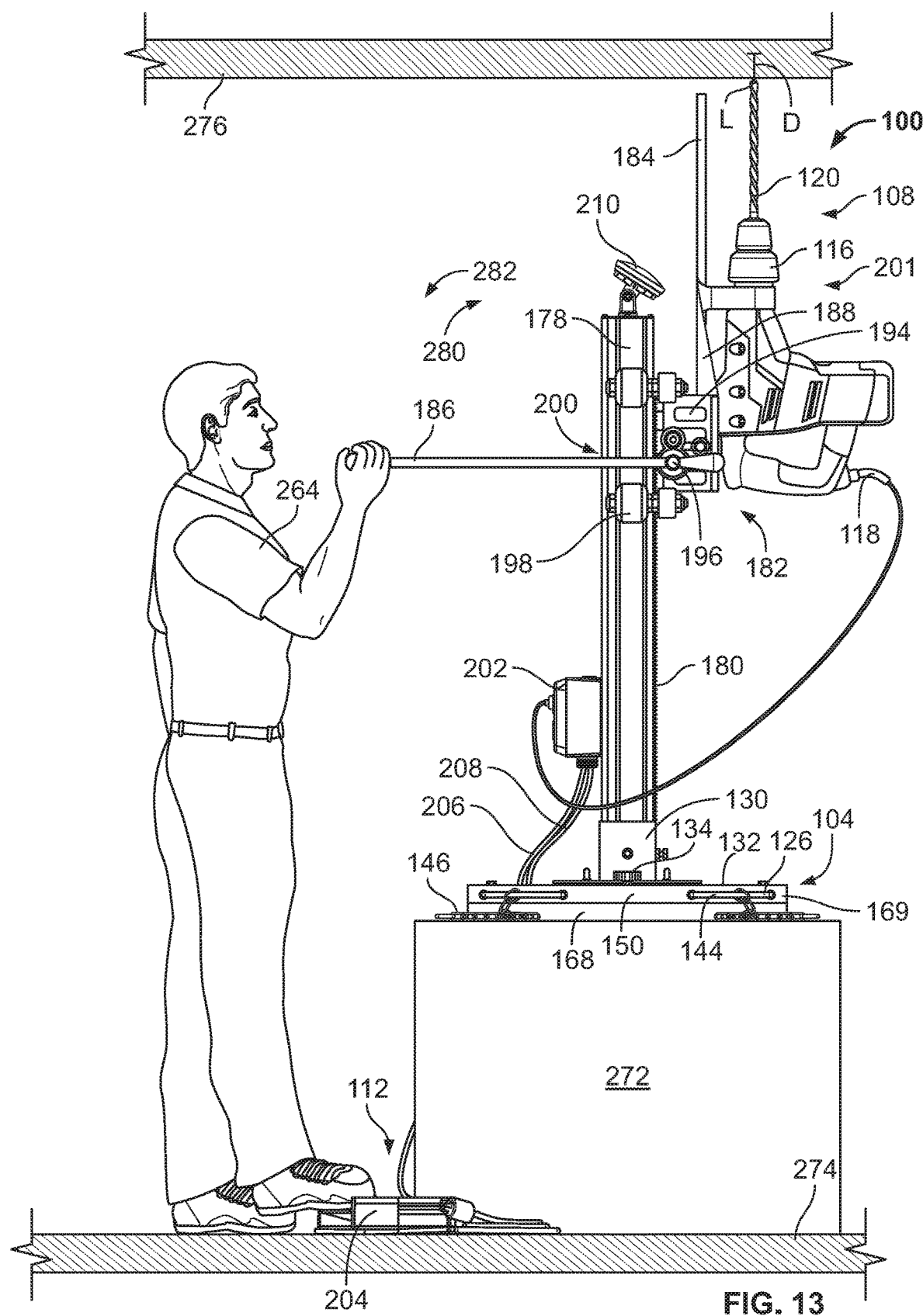
FIG. 13 is a side view of the first example assembly of FIGS. 4-6 utilized by an operator.

With reference to FIGS. 1, 2, and 6, the carriage 182 includes a gear box 194, a shaft 196, a plurality of rollers 198, and a stop handle 200. The gear box 194 also includes an internal gear train (not shown) configured to selectively engage the rack gear 180. The gear box 194 supports the shaft 196, the plurality of rollers 198, and the stop handle 200. The shaft 196 passes through the gear box 194. With reference to FIG. 11, the shaft 196 may connect to the actuating lever 186. The plurality of rollers 198 rollingly engage the mast 178 to quickly move the carriage 182 relative to the mast 178. Returning to FIGS. 1, 2, and 6, the stop handle 200 is connected to the internal gear train to selectively engage the internal gear train with the rack gear 180. With reference to FIG. 13, when the stop handle 200 is engaged, the carriage 182 is secured to prevent downward movement of the carriage 182 from a ready position 201 along the mast 178 toward the adjuster plate 132. The shaft 196 is connected to the internal gear train to actuate the internal gear train and incrementally advance the carriage 182 upwardly along the rack gear 180.

With reference to FIGS. 1-6, the electrical components 112 include a first electrical outlet 202, a pedal switch 204, a second electrical cord 206, a third electrical cord 208, and a lamp 210. The first electrical outlet 202 is supported by the mast 178. With reference to FIGS. 4-6, the drill 116 may be plugged into the first electrical outlet 202. The pedal switch 204 is in electrical communication with the first electrical outlet 202 via the third electrical cord 208. The second electrical cord 206 is in electrical communication with the first electrical outlet 202. The second electrical cord 206 is configured to connect to a power source (e.g., an electrical wall outlet or a generator) (not shown). The drill 116 is in communication with the first electrical outlet 202 via the first electrical cord 118. The pedal switch 204 controls delivery of electrical energy from the power source to the drill 116 via the first electrical outlet 202. For example, when the pedal switch 204 is pressed, electrical energy is transmitted to the drill 116 to turn the bit 120. Additionally, for example, when the pedal switch 204 is released, electrical energy is not transmitted to the drill 116 to stop the bit 120. The lamp 210 is supported by the mast 178 and is in electrical communication with the first electrical outlet 202. The lamp 210 directs illumination generally upwardly. In some embodiments, the lamp 210 illuminates whenever the second electrical cord 206 is plugged into the power source. In some embodiments, the lamp 210 illuminates when the pedal switch 204 is pressed while the second electrical cord 206 is plugged into the power source.

Figure 9:
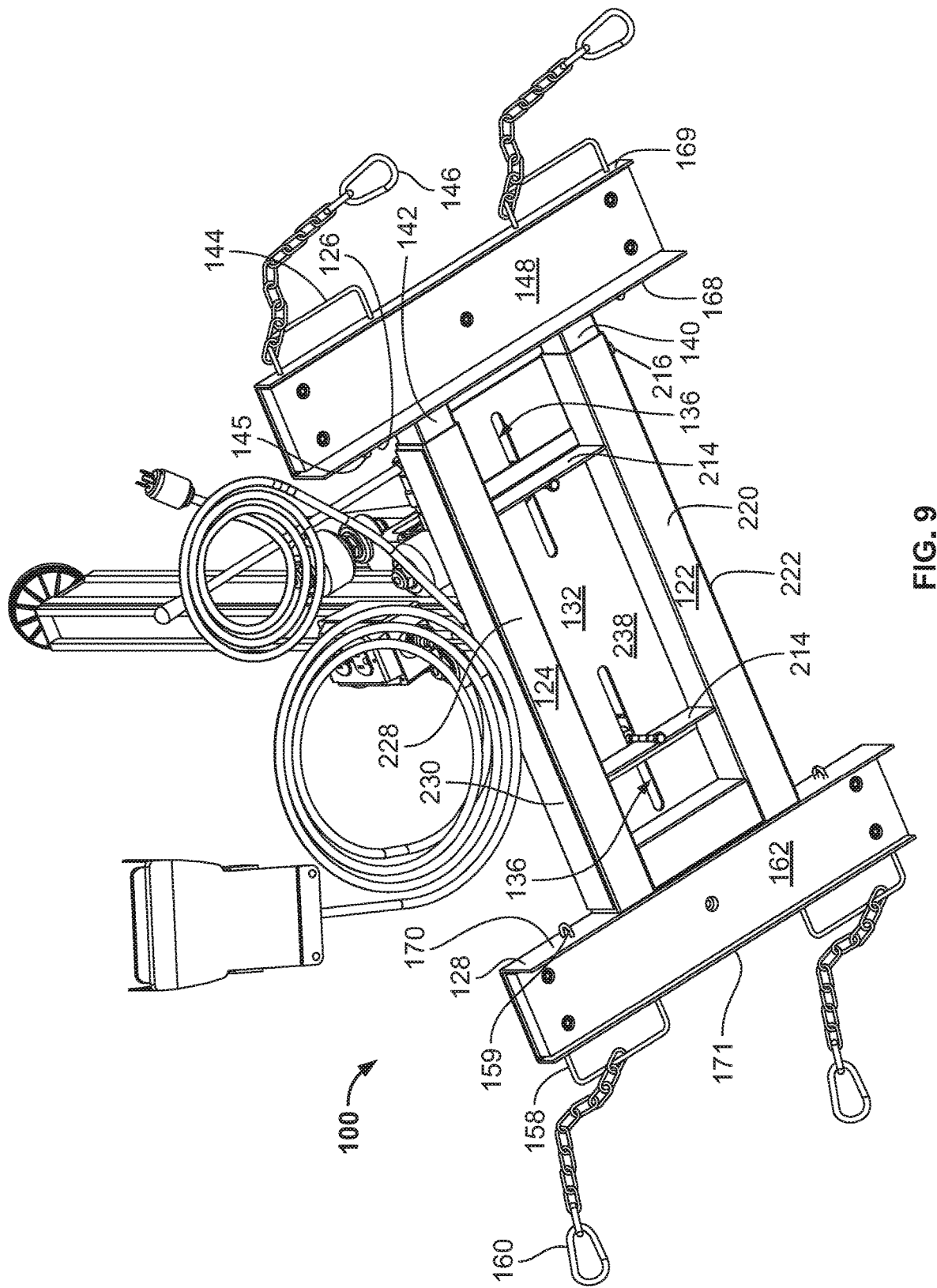
FIG. 9 is a bottom view of the first example drill mount assembly of FIGS. 1-8.
Figure 10:
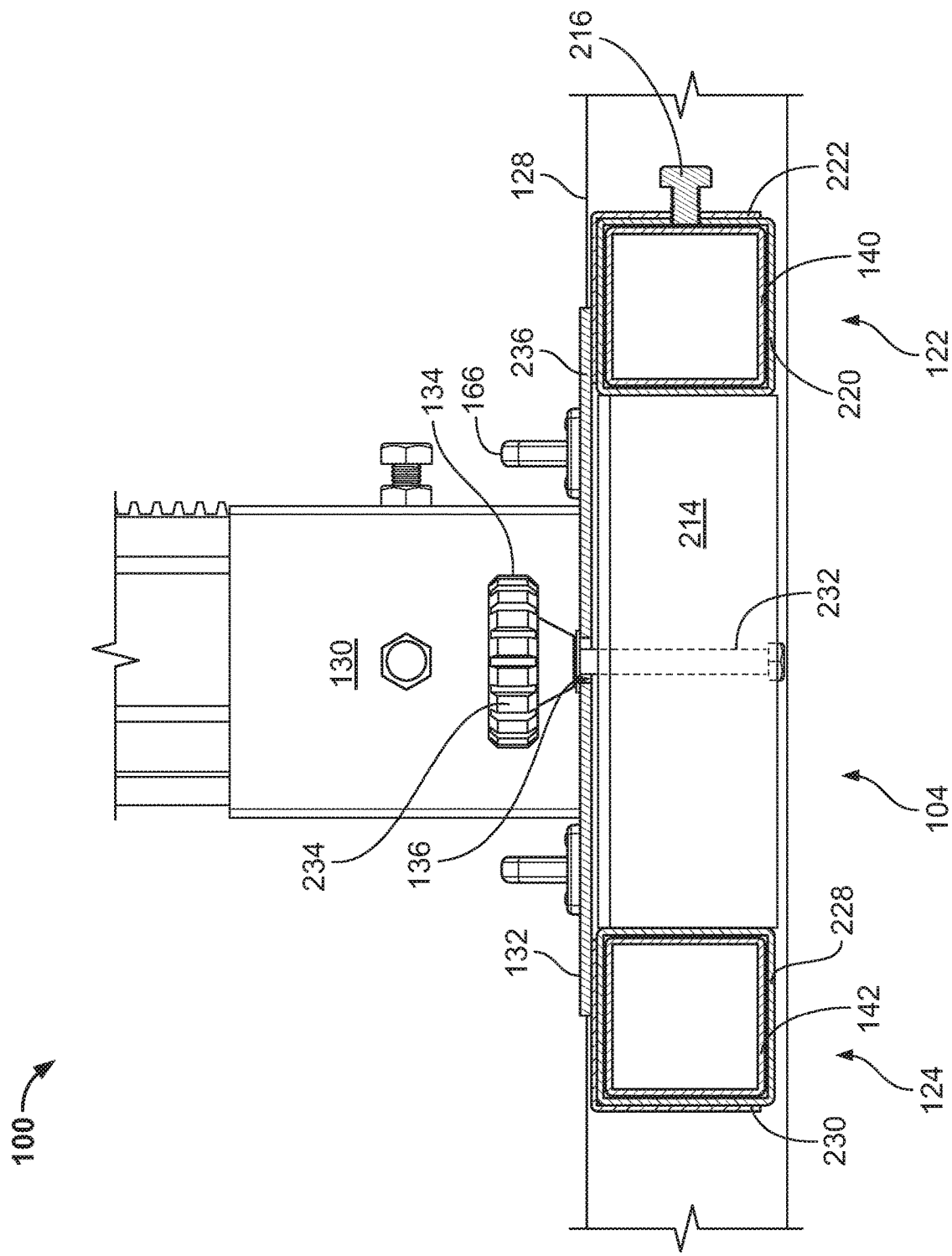
FIG. 10 is a partial cross sectional view of the first example drill mount assembly of FIGS. 1-9 taken along line 10-10 of FIG. 4.

With reference to FIGS. 9 and 10, the base 104 further includes one or more support spacers 214 and one or more adjustment fasteners 216. The support spacer 214 is connected to the first rail 122 and the second rail 124 to provide transverse support between the first rail 122 and the second rail 124. By providing transverse support, the support spacer 214 maintains spacing between the first rail 122 and the second rail 124. One of the adjustment fasteners 216 is engaged with the first rail 122 and the first extender 140 to retain the first foot 126 and the second foot 128 relative to one another. In some embodiments, another of the adjustment fasteners 216 is engaged with the second rail 124 and the second extender 142 to retain the first foot 126 and the second foot 128 relative to one another. With reference to FIG. 10, in some embodiments, one or more of the adjustment fasteners 216 is a set screw threadably engaged with the first rail 122 and/or the second rail 124 to respectively drive against the first extender 140 and the second extender 142. In some embodiments, one or more of the adjustment fasteners 216 is a pin extending through the first rail 122 and the first extender 140 and the second rail 124 and the second extender 142. In such embodiments, the first extender 140 and/or the second extender 142 defines a corresponding series of longitudinally-spaced openings (not shown).

With reference to FIG. 10, the first rail 122 includes a first support 220 and a first bumper 222. Similarly, the second rail 124 includes a second support 228 and a second bumper 230. Additionally, in some embodiments, each fastener 134 includes a bolt 232 and a nut 234. It should be appreciated that the first rail 122 and the second rail 124 are mirror images of one another. The first extender 140 is slidably disposed in the first support 220. The second extender 142 is slidably disposed in the second support 228. While the first extender 140 and the first support 220 are depicted as rectilinear tubes in FIG. 10, it is anticipated that the first extender 140 and the first support 220 may be formed of alternative complementarily-shaped structures (e.g., round pipe, ovate pipe, angle bar stock, etc.). Similarly, it is anticipated that the second extender 142 and the second support 228 may be formed of alternative complementarily-shaped structures other than the rectilinear tubes shown in FIG. 10. In some embodiments, the first support 220 and the second support 228 are metallic. In some embodiments, the first bumper 222 and the second bumper 230 are formed of a polymer having low-friction surface properties (e.g., polytetrafluoroethene (PTFE) or perfluoroalkoxy polymer resin (PFA)).

Looking still at FIG. 10, the first bumper 222 is "L" shaped and is engaged with the first support 220 and the adjuster plate 132. The first bumper 222 extends outwardly and upwardly from the first support 220. The first rail 122 slides relative to the adjuster plate 132 via the first bumper 222. The bolt 232 is directly mounted (e.g., welded) to the support spacers 214 to align with the slot 136. Thus, the bolt 232 is inboard of the first support 220 and the second support 228. Additionally, the bolt 232 is externally threaded and extends upwardly through the adjuster plate 132 to threadably engage the nut 234. The nut 234 tightens against the adjuster plate 132 opposite the first rail 122 and the second rail 124. The nut 234 is depicted as a knob in FIG. 10. It is anticipated that the nut 234 may be any type of internally threaded nut. Further, the fastener 134 may include a washer about the bolt 232 between the nut 234 and the adjuster plate 132 (not shown).

Referring again to FIG. 10, the second bumper 230 is "L" shaped and is engaged with the second support 228 and the adjuster plate 132. The second bumper 230 extends outwardly and upwardly from the second support 228. The second rail 124 slides relative to the adjuster plate 132 via the second bumper 228.

Continuing to look at FIG. 10, the bolt 232 extend through the adjustment plate 132 via the slot 136. It should be understood that the bolt 232 is partially obscured by the support spacer 214 in the illustrated example of FIG. 10. Thus, in FIG. 10, the bolt 232 is partially shown in phantom. When the nut 234 is threaded onto the bolt 232, the nut 234 is tightened against adjustment plate 132.

Referring still to FIG. 10, the adjustment plate 132 is slidably engaged with the first bumper 222 and the second bumper 230. Thus, the adjuster plate 132 is slidably engaged with the first rail 122 and the second rail 124 via the first bumper 222 and the second bumper 230.

Figure 12:
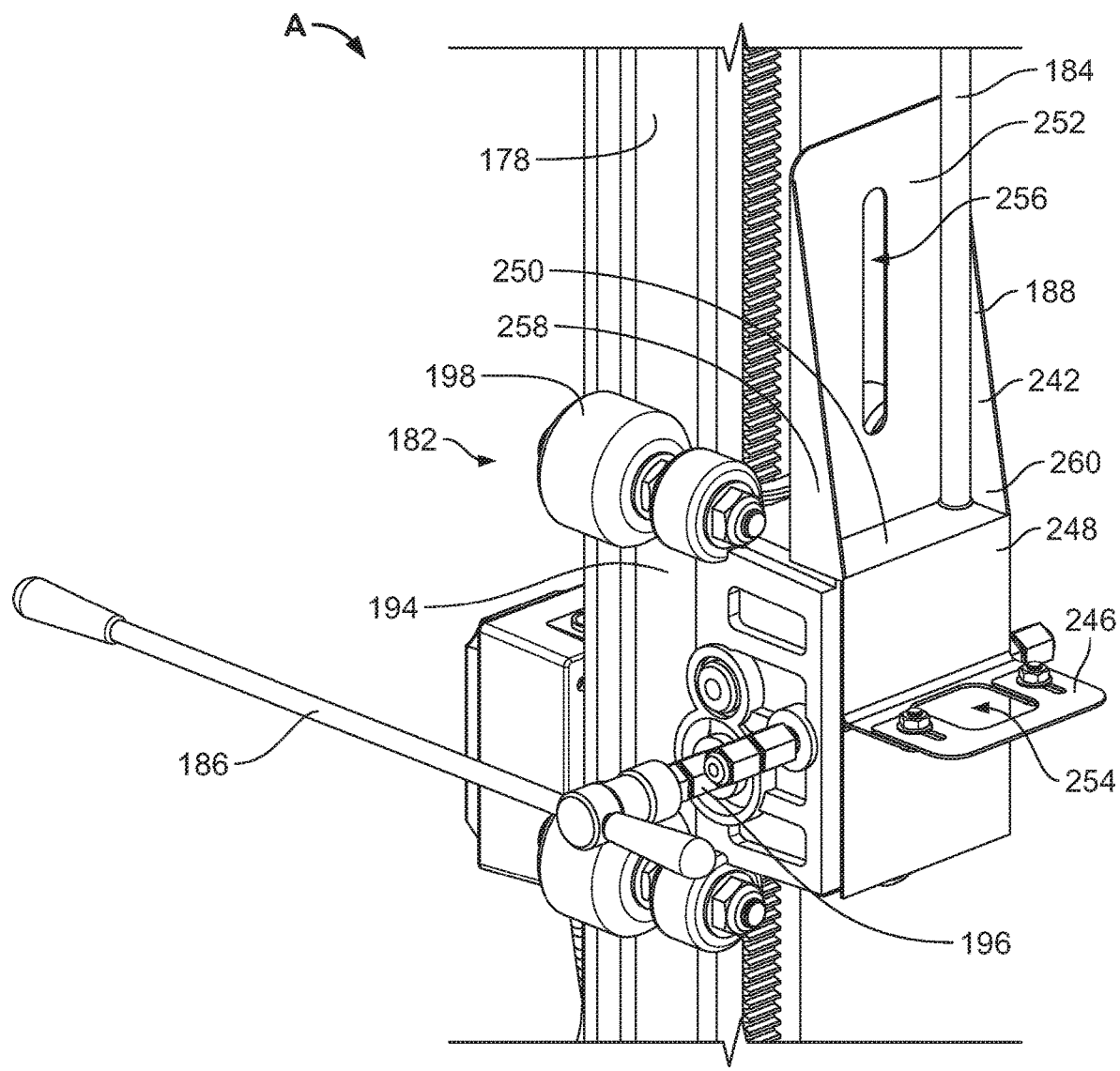
FIG. 12 is an enlarged view of a support bracket of the first example drill mount assembly of FIGS. 1-9 taken from region A of FIG. 3.

With reference to FIGS. 11 and 12, the support bracket 188 includes a body 242 and a backstop 246. The body 242 includes a first wall 248, a second wall 250, and a third wall 252. The first wall 248 and the third wall 252 are generally parallel. The second wall 250 joins and is generally perpendicular to the first wall 248 and the third wall 252. The backstop 246 extends from the body 242 via the first wall 248. The support bracket 188 connects to the carriage 182 via the first wall 248. When the support bracket 188 is installed on the carriage 182, the third wall 252 is between the mast 178 and the first wall 248. Further, the body 242 includes a first side wall 258 and a second side wall 260. The first side wall 258 and the second side wall 260 are connected to the third wall 252 and the second wall 250. The first side wall 258 and the second side wall 260 are opposite one another. Additionally, the backstop 246 is hinged and defines an opening 254. In operation, the backstop 246 may be opened, a handle end of a drill may be placed in the backstop 246, and the backstop 246 may be closed about the handle end to retain the handle end in the opening 254. Thus, the backstop 246 accommodates, secures, and supports differing handle ends of drills via the opening 254. The third wall 252 defines a slot 256. The slot 256 extends vertically and is aligned with the mast 178. In the example of FIG. 11, the third wall 252 and the backstop 246 are respectively configured to secure and support the drill 116. More specifically, when the drill 116 is mounted to the support bracket 188, a handle of the drill 116 extends through the opening 254 (not shown). Further, the slot 256 slidably accommodates drills of differing lengths and configurations (e.g., the drill 116). For example, a drill may include an opening proximate its bit end, the opening configured to receive a threaded handle. Alternatively, a collar for receiving a threaded handle may be configured to fit around the bit-end of a drill, as shown in FIG. 13. In either case, the shank of a threaded fastener (not shown) may be passed through the slot 256 to be received by the thread-receiving portion of the drill or collar. Once tightened, the head of the fastener may bear against an inward side of the third wall 252 to securely hold the drill 116 to the carriage 182.

With reference to FIG. 13, in operation, an operator 264 approximately positions the drill mount assembly 100 on a table 272 placed along a floor 274 under a drilling location L in a ceiling 276. Further in operation, the operator 264 releases the internal gear train of the gear box 194 from the rack gear 180 via the stop handle 200 (shown in FIGS. 1, 2, 6, 7, and 8). Additionally in operation, the operator 264 rollingly moves the carriage 182 upwardly along the mast 178 until the bit 120 is next to and/or lightly contacts the ceiling 276. Then, in operation, the operator 264 engages the internal gear train with the rack gear 180 via the stop handle 200. When the internal gear train of the gear box 194 is engaged with the rack gear 180, the internal gear train and the rack gear 180 hold the carriage at the ready position 201 relative to the mast 178. In other words, when the internal gear train and the rack gear 180 are meshed, the carriage 182 is prevented from moving downwardly along the mast 178 beyond the ready position 201. Before or after raising the carriage 182, the operator 264 may loosen the plurality of fasteners 134 to move the adjuster plate 132 (shown in FIGS. 1-4, 7 and 8) and the mast 178 to finely adjust the bit 120 relative to the ceiling 276. Once the bit 120 is finely adjusted below the drilling location L, the operator 264 tightens the plurality of fasteners 134. Further in operation, the operator 264 actuates the pedal switch 204 to energize the drill 116 to turn the bit 120. While the bit 120 is turning, the operator 264 pivots the actuating lever 186 relative to the gear box 194 in a first direction 280 to advance the carriage 182 upwardly relative to the mast 178. As the carriage 182 moves upwardly, the bit 120 contacts the ceiling 276 and drills into the ceiling 276 until the depth-limiting rod 184 contacts the ceiling 276. Once the bit 120 reaches a desired depth D in the ceiling 276 determined by the depth-limiting rod 184, the operator 264 pivots the actuating lever 186 in a second direction 282 to retract the carriage 182 downwardly relative to the mast 178. The operator 264 also may release the pedal switch 204 to stop the bit 120. The operator 264 then may move the drill mount assembly 100 along the table 272 and/or may reposition the table 272 along the floor 274 to drill one or more additional holes in the ceiling 276 using a process similar to the one just described.

In an alternative configuration (not shown), the drill mount assembly 100 may be used on high ceilings, e.g., in office, warehouse, or loft environments, where it is not practical to place the assembly on a floor. In such situations, the drill mount assembly 100 may be lifted (preferably) by two or more individuals, e.g., by grasping the first and second sets of handles 144, 158, and then placed on the railings of a scissor lift so that a lower end of the assembly is generally at or above a waist height of the operator. In order to accommodate a width between the railings of the scissor lift, the first mount 150 may be telescoped toward or away from a remainder of the assembly 100 until a desired width is reached. The assembly 100 then is secured to the scissor lift, e.g., by securing the first and second sets of retention chains 146, 160 to respective structures on the lift or by wrapping the retention chains 146, 160 around an underside of the scissor lift railings and securing them to first and second sets of chain anchor loops 145, 159, respectively. The operator then may position the foot pedal 204 on a platform portion of the scissor lift so as to be able to actuate the apparatus when standing on the lift. In this configuration, in order to operate the apparatus, the operator may navigate the scissor lift to a position proximate a desired drilling location L using the lift's controls. The user then may slide the assembly 100 along the rails of the lift in order to position the lift precisely relative to the drilling location L in a first direction and/or loosen the plurality of fasteners 134 to move the adjuster plate 132 and the mast 178 to finely adjust the bit 120 precisely to the drilling location L in a second, orthogonal direction. At that point, the operator 264 may tighten the plurality of fasteners 134, and the bit 120 may be positioned precisely at the drilling location L. The operator 264 then may proceed with drilling the desired hole according to the steps outlined in the previous example.

Embodiments of the present disclosure provide a drill mount, and, more particularly, an ergonomic drill mount assembly that is configured help operators in lifting a drill to quickly and accurately drill holes in ceilings. The drill mount assembly system includes an adjustable base, which positions a drill under a desired hole location in a ceiling and a mast and a carriage, which upwardly advance the drill toward the ceiling.

From the foregoing, it will be appreciated that the above example drill mount assembly 100 adapts to initially, approximately and subsequently, finely position a drill relative to drilling location in a ceiling and to raise the drill to the ceiling to drill a hole at the drilling location. Additionally, because the drill mount assembly 100 has a base with adjustable feet, the drill mount assembly 100 may be mounted on an industrial vehicle (e.g., a scissor lift). Further, because the adjustable feet have respective inner faces, the base transmits a reaction force in response to torque from the drill to maintain the position of the drill relative to the ceiling. Thus, the drill mount assembly 100 may help an operator to drill holes in the ceiling, which may accelerate job progress and/or improve drilling cycle efficiency. Moreover, because the drill mount assembly 100 facilitates operators in drilling overhead holes quickly and accurately, the ceiling-mounted fasteners may be more quickly and securely installed in the ceiling, which may prevent loss and/or waste of the fasteners. Thus, the above-disclosed drill mount assembly 100 conserves resources and may improve work efficiency as compared to traditional drilling techniques.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A drill mount assembly, comprising:
   a base assembly having
      a first mount,
      a second mount extendable relative to the first mount in a first direction along a first plane, and
      an adjuster plate slidable relative to the second mount in a second direction along the first plane;
   a mast extending from the adjuster plate in a third direction outside of the first plane; and
   a support bracket movably connected to the mast,
   wherein the adjuster plate is connected to the second mount via a rail, and
   wherein the adjuster plate is slidably engaged with the rail.

2. The drill mount assembly of claim 1, wherein the first mount and the second mount are C-shaped.

3. The drill mount assembly of claim 1, wherein the first mount has a first inner face and the second mount has a second inner face.

4. The drill mount assembly of claim 3, wherein:
   the first mount has a first outer face,
   the second mount has a second outer face, and
   the first and second inner faces extend downwardly a greater amount than the first and second outer faces, respectively.

5. The drill mount assembly of claim 1, wherein the mast is removably connected to the adjuster plate via a mast bracket.

6. The drill mount assembly of claim 1, wherein the adjuster plate includes a low-friction coating facing the rail.

7. The drill mount assembly of claim 1, wherein the adjuster plate is connected to the rail via a fastener passing through a slot defined in the adjuster plate.

8. The drill mount assembly of claim 7, wherein the fastener is a quick-release fastener.

9. The drill mount assembly of claim 1, further comprising a first pad connected to the first mount and a second pad connected to the second mount.

10. The drill mount assembly of claim 1, wherein the support bracket is configured to support a drill.

11. The drill mount assembly of claim 1, further comprising an electrical outlet connected to the mast.

12. The drill mount assembly of claim 11, further comprising a switch in communication with the electrical outlet, wherein the switch controls the electrical outlet.

13. A drill mount assembly, comprising:
   a base assembly having
      a first foot,
      a rail connected to the first foot,
      a second foot extendably coupled to the rail, and
      an adjuster plate slidably engaged with the rail;
   an upright assembly having
      a mast connected to the adjuster plate, and
      an electrical outlet connected to the mast; and
   a pedal switch in electrical communication with the electrical outlet to control the electrical outlet.

14. The drill mount assembly of claim 13, further comprising a carriage moveably engaged with the mast to support a drill and selectively hold the drill at a ready position relative to the mast.

15. A drill mount assembly, comprising:
   a base having
      a first inner face,
      a second inner face telescopically moveable relative to the first inner face in a first direction along a first plane, and an adjuster plate laterally moveable relative to the first inner face and the second inner face along the first plane;

a mast connected to the adjuster plate and extending from the adjuster plate in a third direction outside of the first plane;

a rack gear along the mast;

a carriage moveably engaged with the mast and selectively engageable with the rack gear; and an electrical outlet connected to the mast.

16. The drill mount assembly of claim 15, further comprising a lamp mounted to the mast; and a pedal switch controlling the electrical outlet.

* * * * *